(12) United States Patent
Warkentin

(10) Patent No.: US 8,948,996 B2
(45) Date of Patent: Feb. 3, 2015

(54) METRICS-BASED TRANSPORT VEHICLE FLEET SAFETY

(71) Applicant: Fleetmetrica Inc., Thornhill (CA)

(72) Inventor: W. Ward Warkentin, Thornhill (CA)

(73) Assignee: Fleetmetrica Inc., Thornhill (CA)

(*) Notice: Subject to any disclaimer, the term of this patent is extended or adjusted under 35 U.S.C. 154(b) by 43 days.

(21) Appl. No.: 13/722,330

(22) Filed: Dec. 20, 2012

(65) Prior Publication Data

US 2014/0180556 A1 Jun. 26, 2014

(51) Int. Cl.
*G06F 19/00* (2011.01)
*G06F 17/00* (2006.01)
*G06Q 50/30* (2012.01)
G06Q 10/06 (2012.01)
B60K 28/06 (2006.01)
G05B 23/02 (2006.01)

(52) U.S. Cl.
CPC ............ *G06F 17/00* (2013.01); *G06Q 10/0639* (2013.01); *B60K 28/06* (2013.01); *G05B 23/0283* (2013.01); *G06Q 50/30* (2013.01)
USPC .......... 701/99; 701/29.3; 701/30.9; 701/31.1; 340/438; 340/439

(58) Field of Classification Search
CPC .. G05B 23/0283; G08G 1/0104; B60K 28/06; G06Q 10/06; G06Q 10/0639; G06Q 50/30; G07C 5/0858; G07C 5/02
USPC ................. 701/29.1, 29.3, 30.9, 31.1, 36, 99; 340/425.5, 438, 439
See application file for complete search history.

(56) References Cited

U.S. PATENT DOCUMENTS

| | | | |
|---|---|---|---|
| 5,583,797 | A | 12/1996 | Fluegge et al. |
| 7,480,551 | B1 | 1/2009 | Lowrey et al. |
| 2002/0177930 | A1 | 11/2002 | Martin et al. |
| 2003/0004624 | A1 | 1/2003 | Wilson et al. |
| 2004/0138790 | A1 | 7/2004 | Kapolka et al. |
| 2005/0171835 | A1 | 8/2005 | Mook et al. |
| 2006/0235707 | A1 | 10/2006 | Goldstein et al. |
| 2007/0173991 | A1* | 7/2007 | Tenzer et al. ............... 701/29 |
| 2007/0173993 | A1 | 7/2007 | Nielsen et al. |
| 2010/0087984 | A1 | 4/2010 | Joseph |
| 2010/0138149 | A1 | 6/2010 | Ohta et al. |
| 2011/0172958 | A1 | 7/2011 | Archie et al. |

(Continued)

OTHER PUBLICATIONS

James Menzies, "Truck News", Sep. 2012, p. 64.
(Continued)

*Primary Examiner* — Gertrude Arthur Jeanglaude
(74) *Attorney, Agent, or Firm* — Perry + Currier Inc.

(57) ABSTRACT

Vehicle operations data is received from a plurality of data capturing devices installed at a plurality of transport vehicles. The vehicle operations data is representative of sensor output captured by the data capturing devices. Data sets are processed to obtain different vehicle safety metrics defined by the different types of sensors. An indication of non-conformance can be output when a compared vehicle safety metric does not conform to a threshold. Vehicle safety metrics can be combined into a combined representation of a categorical aspect of vehicle safety, which can be dynamically updated whenever a metric is added or removed. Combined representations can be filtered or grouped according to a reporting criterion to generate reports for drivers, units, company divisions, and the like. Vehicle operations data can be converted from multiple different formats used by different data sources to a common format used for processing metrics and combined representations.

28 Claims, 14 Drawing Sheets

(56) References Cited

U.S. PATENT DOCUMENTS

2012/0296514 A1 11/2012 Sohmshetty et al.

OTHER PUBLICATIONS

Zurich Fleet Intelligence, "Powerful reporting and analysis at your fingertips", Copyright 2012, retrieved from the Internet Dec. 20, 2012, http://www.zurichfleetintelligence.com/ca-en/solutions/reporting-capabilities.php.

International Search Report dated May 26, 2014 relating to PCT International Application No. PCT/CA2013/001056.

Written Opinion of the International Searching Authority dated May 26, 2014 relating to PCT International Application No. PCT/CA2013/001056.

\* cited by examiner

DRIVER ANALYSIS SUMMARY

Analysis Period: 2012-07-25 to 2012-08-29
Driver: Wilson
Equipment IDs: 2395

| | | |
|---|---|---|
| Mileage (mi): | 10516.00 | Fleet average...... 7810.81 |
| MPG: | 6.31 | Fleet average...... 6.70 |
| % Idle: | 16.99% | Fleet average...... 9.73% |
| Hard Brakes (number): | 0.00 | Fleet average...... 1.69 |
| Hard Brakes (per 1000 mi): | 0.00 | Fleet average...... 0.36 |
| % Over Speed: | 0.15% | Fleet average...... 0.17% |
| % High RPM: | 0% | Fleet average...... 0.08% |
| % Low RPM: | 5.55% | Fleet average...... 7.76% |

COMMENTS:
Nice work, Wilson, but remember to check your tire pressure more
frequently and shut it down when parked. [7-30-2012]

*Fig. 15*

METRICS-BASED TRANSPORT VEHICLE FLEET SAFETY

TECHNICAL FIELD

The present invention relates to transport vehicles, more specifically, to techniques for processing data related to transport vehicle fleet safety.

BACKGROUND

It is an important concern to ensure the safety of transport vehicle drivers as well as other drivers on the road. It is also important to ensure that transport vehicles are well maintained to operate in an efficient and safe manner.

Transport vehicles are known to have electronic on-board recorder (EOBR) devices that capture and store data related to vehicle operation. Analysing such data can be used to address safety concerns.

However, accessing safety-related data can be cumbersome and not user-friendly. Existing reports and scorecards are not readily understood by those who need them. Further, there is little in the way of prioritization of problems that require attention. Moreover, processing operation data to obtain meaningful safety-related information may require excessive hardware and software resources.

In addition, interpretation of safety-related information can involve arbitrary targets, which can lead to inefficiency due to overcorrection or under-correction. Use of such targets usually result in an exception-based reporting system, in which only drivers that fail to conform to targets are provided with feedback. In addition, targets may also result in too many false alarms, which can eventually lead to a loss of confidence in such systems. Further, known systems are typically driver-centric and mainly consider driver behaviour without giving due consideration to other factors.

Another disadvantage of known systems is that there is a lack of techniques for obtaining safety-related information from different types of EOBR devices within the same fleet of vehicles.

BRIEF DESCRIPTION OF THE DRAWINGS

The drawings illustrate, by way of example only, embodiments of the present invention.

FIG. 15 shows an example of a static report.

DETAILED DESCRIPTION

Figure 1:
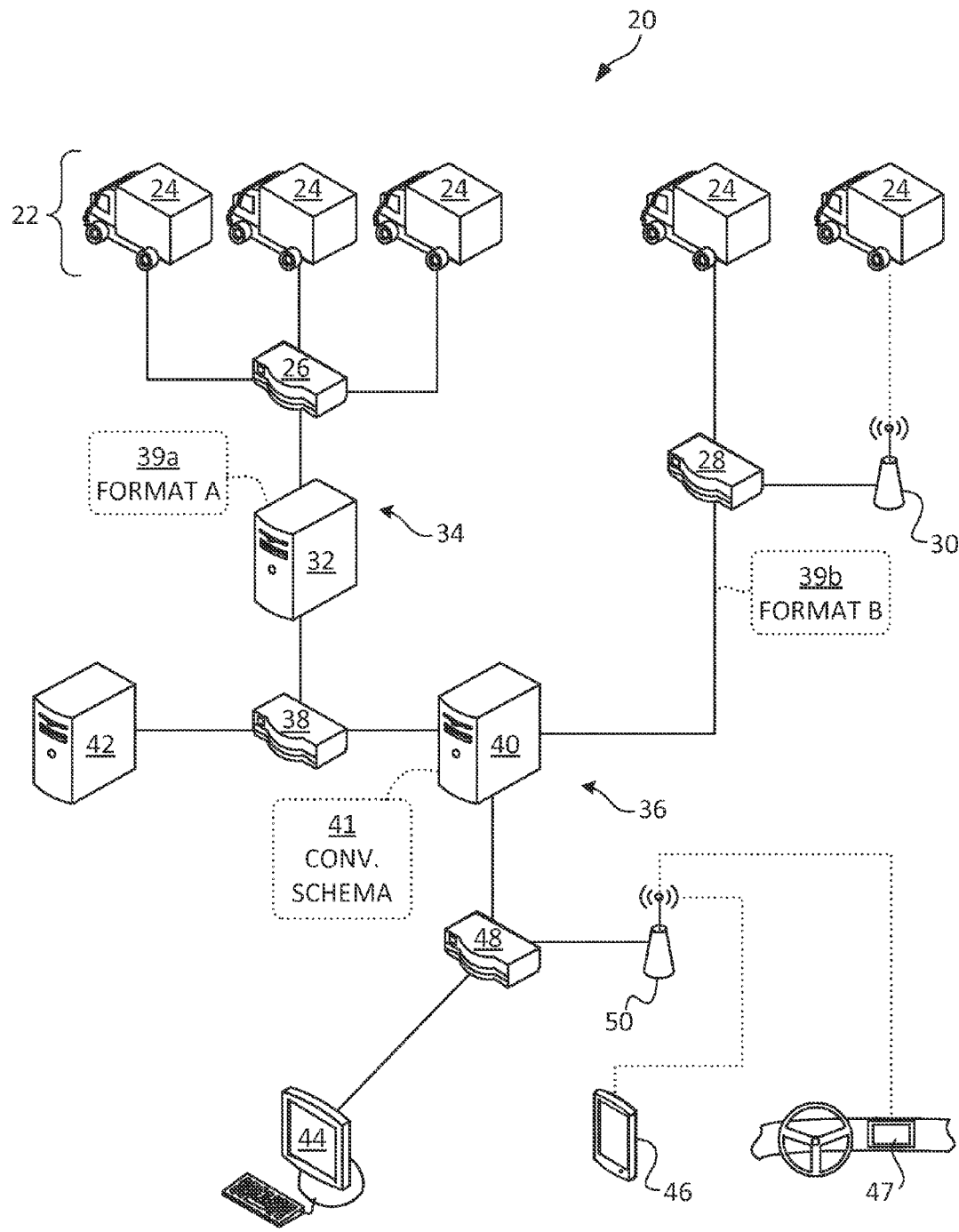
FIG. 1 is a diagram of a transport vehicle fleet data capturing system including a system for processing data related to transport vehicle fleet safety.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functions described in this specification have been described as embodied in programs stored in memory and executable by processors. Programs may indeed be implemented in software for execution by various types of processors. An identified program of executable code may, for instance, comprise one or more physical or logical blocks of computer instructions, which may, for instance, be organized as an object, procedure, or function. Nevertheless, the executables of an identified program need not be physically located together, but may comprise disparate instructions stored in different locations which, when joined logically together, comprise the program and achieve the stated purpose for the program.

A program may also be implemented as a hardware circuit comprising custom VLSI circuits or gate arrays, off-the-shelf semiconductors such as logic chips, transistors, or other discrete components. A program may also be implemented in programmable hardware devices such as field programmable gate arrays, programmable array logic, programmable logic devices or the like.

Indeed, a program of executable code may be a single instruction, or many instructions, and may even be distributed over several different code segments, among different programs, and across several memory devices. Similarly, operational data may be identified and illustrated herein within programs, and may be embodied in any suitable form and organized within any suitable type of data structure. The operational data may be collected as a single data set, or may be distributed over different locations including over different storage devices, and may exist, at least partially, merely as electronic signals on a system or network. The programs may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention.

One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1 illustrates a transport vehicle fleet data capturing system 20, according to one embodiment of the present invention.

The system 20 includes a fleet 22 of transport vehicles 24, such as semi-trailer trucks, single-axle trucks, delivery vehicles, walk-in vans, box trucks, and the like. Each of the transport vehicles 24 includes at least one sensor-based data capturing device for capturing data related to vehicle operations.

The data capturing devices at the vehicles 24 can be connected to one or more network access points 26, 28, 30 in order to upload captured data to a network for processing. Examples of network access points 26, 28, 30 include wired or wireless routers, network adaptor cards, universal serial bus (USB) cables and hubs, and the like.

The data capturing devices can be of the same type or of different types. Some or all of the data capturing devices can be of a type that is supported by one or more servers 32 operated by the third-party provider of such data capturing devices. Accordingly, specific types of data capturing devices may provide their data to such servers 32 via one or more networks 34, which may include one or more network access points 26 and similar devices. Such servers 32 can be connected a safety data processing system 36 via a routers, switches, and similar network devices 38.

Some or all of the data capturing devices can be of a type that allows the operator of the fleet 22 to download captured data directly. Accordingly, such data may be directly provided to the safety data processing system 36 via the network access point 28 or like device, without the need to traverse the systems of an intermediate third-party provider.

Different types of data capturing devices output data in different formats, as do different third-party networks 34. One function of the safety data processing system 36 is to covert different formats of captured data to a common format. This advantageously allows operations data for the entire fleet 22, or a subset thereof, to be viewed, analyzed, and compared regardless of original format.

In one example, the third party network 34 operates on captured data 39a in a first format A, while captured data 39b of other vehicles 24 in the fleet is in a second format B. The first format may store data that is time stamped with US standard format dates and may store signal values in imperial units, while the second format may store data that is time stamped with ISO dates and may store data signal values in SI units. Many other examples of different formats are also possible.

The system 36 is configured for processing data related to the safety of the transport vehicle fleet. The system 36 includes one or more servers 40 connected to one or more networks. The server 40 is configured to receive the vehicle operations data from various data sources including directly from data capturing devices installed at the plurality of transport vehicles 24, from third-party networks 34 that collect vehicle operations data from supported data capturing devices, and other sources, such as a government data source (server) 42 that stores vehicle violation data.

The server 40 is configured to convert the vehicle operations data from multiple different formats used by the data sources to a common format, such that metrics from vehicles with different types of data collecting devices can be meaningfully compared.

The server 40 references a conversion schema 41 for data that needs to be converted to the common format. The conversion schema 41 can include factors that original signal data is to be multiplied by to obtain data in the common format. The conversation schema can also include formatting rules, such as a date conversion rule. Further, if original signal data is sampled at a higher rate than the common format requires, a conversion rule for dropping or averaging data points can be provided. The conversion schema 41 can include additional or alternative rules as required by the formats of the original data and the common format.

The server 40 is further configured to provide a user interface to one or more client devices 44, 46, 47 connected to the server 40 via one or more network devices 48, 50. The client devices 44, 46, 47 may include computers such as desktop computers, laptop computers, smart phones, tablet computers, netbooks, in-cab information systems, and the like. In-cab information systems 47 may be modified versions of pre-existing dash-mounted systems typically used for navigation or monitoring of vehicle 24 performance, or may be specialized systems used primarily for displaying the types of output discussed herein. The user interface is configured to allow selection of data sets from the converted vehicle operations data according to different criteria.

The server 40 is configured to process data sets to obtain and output for display at the user interface different vehicle safety metrics defined by different sensors connected to the data capturing devices. The server is also configured to combine different sets of the vehicle safety metrics to obtain different combined representations of different categorical aspects of vehicle safety, and display such as the user interface as well.

The different vehicle safety metrics can include short-term driving time violations (e.g., 11 hour violations), long-term driving time violations (e.g., 70 hour violations), vehicle brake adjustment status, vehicle crash conditions, vehicle computer fault codes, vehicle location (e.g., GPS differential), hard braking, excessive engine speed, vehicle operation time, engine idle time, vehicle lane departures, vehicle mileage, vehicle fuel economy, vehicle over-speed, vehicle rollover conditions, vehicle tire pressure, and similar.

The network devices 26, 28, 30, 38, 48, 50, the servers 32, 40, 42, and client devices 44, 46, 47, can be interconnected via one or more networks, such as a local-area network (LAN), a wide-area network (WAN), an intranet, the Internet, or any combination of such. The server 42 can generate and serve dynamic web pages and the client devices 44, 46, 47 can include web browsers to interact with such pages. In another embodiment, the server 42 supports an application that is run by the client devices 44, 46, 47.

Figure 2:
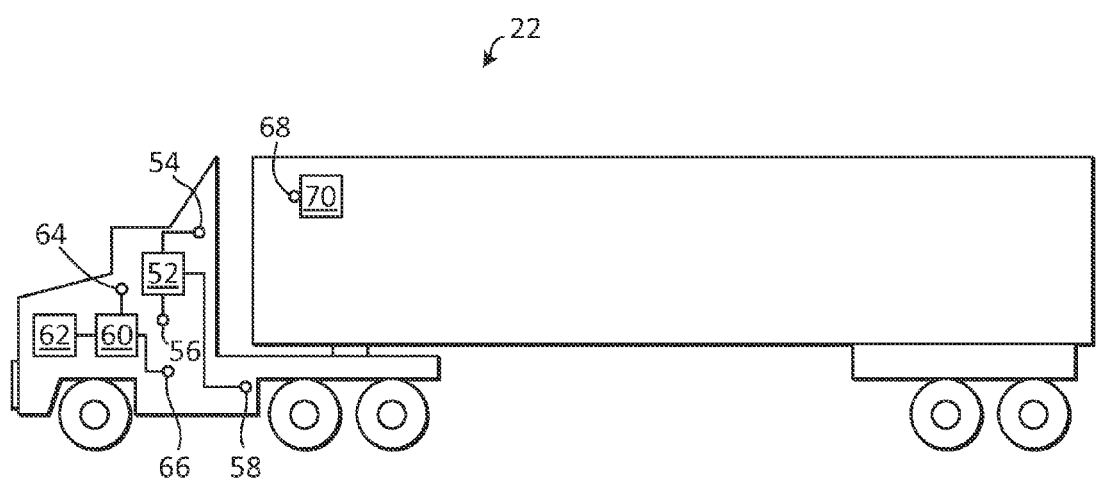
FIG. 2 is a diagram of a transport vehicle having a sensor-based data capturing device.

FIG. 2 shows one of the vehicles 22 with locations of various sensors and data capturing devices.

In some embodiments, one data capturing device 52 supports a plurality of different sensors 54, 56, 58 that directly measure different characteristics of vehicle operation. In some embodiments, a data capturing device 60 is connected to the vehicle computer 62, which captures data from different sensors 64, 66. In some embodiments, a sensor 68 has its own dedicated data capturing device 70. Various combinations of these embodiments are also contemplated.

Regardless of the specific location of the data capturing device and the number and types of sensors that it supports, the data capturing device captures and stores sensor data, which may be in form of raw voltage or current values or may be in form of numerical digital values directly representative of the metric captured (e.g., 50 km/h).

Examples of sensors include, but are not limited to, an odometer, a tachometer, a speedometer, an accelerometer, a brake sensor, a lane-keeping system, a driver time clock or electronic logbook, vehicle state sensors, a crash detection sensor, a GPS device, a rollover detector, a vehicle computer, and similar.

Figure 3:
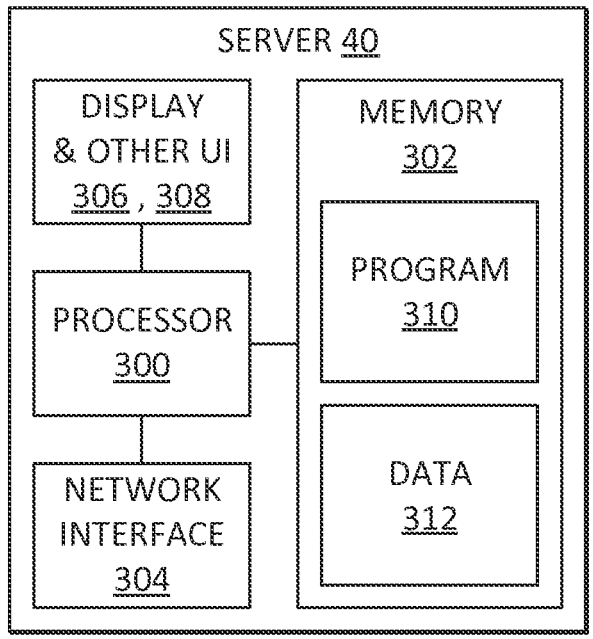
FIG. 3 is a functional block diagram of a server.

FIG. 3 shows an example computer that can be used as the server 40. The server can include a processor 300, memory 302, a network interface 304, and can further include a display 306 and other user interface components 308. The processor 300, memory 302, network interface 304, and display 306 and other user interface 308 are electrically interconnected and can be physically contained within a housing or frame. The server may be computer such as a rack-mount server, blade server, tower server, or another kind of computer, or a process or program running on such a computer.

The processor 300 is configured to execute instructions, which may originate from the memory 302 or the network interface 304. The processor 300 may be known a central processing unit (CPU). The processor 300 can include one or more sub-processors or processing cores.

The memory 302 includes a non-transitory computer-readable medium that is configured to store programs and data. The memory 302 can include one or more short-term or long-term storage devices, such as a solid-state memory chip (e.g., DRAM, ROM, non-volatile flash memory), a hard drive, an optical storage disc, and similar. The memory 302 can include fixed components that are not physically removable from the server (e.g., fixed hard drives) as well as removable components (e.g., removable memory cards). The memory 302 allows for random access, in that programs and data may be both read and written.

The network interface 304 is configured to allow the server to communicate with other computers across a network. The network interface 304 can include one or more of a wired and wireless network adaptor and well as a software or firmware driver for controlling such adaptor.

The display 306 and other user interface components 308, if provided, can include a display device, such as a monitor, a bank of light-emitting diodes (LEDs), or similar for monitoring operations of the server. The user interface 308 can include an input device, such as a keyboard, mouse, touch-sensitive element of a touch-screen display, or similar device. The user interface 308 can be remote to the server and provided via the network interface 304 to a client computer operated by a remote administrator.

One or more programs 310 can be provided to the server 40 to carry out the methods and functionality described herein. Such programs 310 may reference data 312 in the form of databases, files, or other data structures. An example of such a program is a web-based program that generates HTML pages based on data stored in a database.

Figure 4:
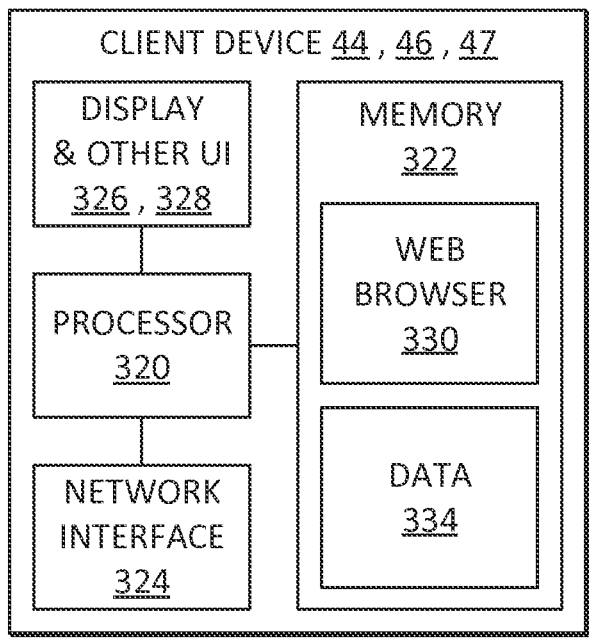
FIG. 4 is a functional block diagram of a client device.

FIG. 4 shows an example computer that can be used as any of the client devices 44, 46, 47. The computer includes a processor 320, memory 322, a network interface 324, and a display 326 and other user interface components 328. The processor 320, memory 322, network interface 324, and display 326 and user interface 328 are electrically interconnected and can be physically contained within a housing or frame.

The processor 320 is configured to execute instructions, which may originate from the memory 322 or the network interface 324. The processor 320 may be known as a CPU. The processor 320 can include one or more sub-processors or processing cores.

The memory 322 includes a non-transitory computer-readable medium that is configured to store programs and data. The memory 322 can include one or more short-term or long-term storage devices, such as a solid-state memory chip (e.g., DRAM, ROM, non-volatile flash memory), a hard drive, an optical storage disc, and similar. The memory 322 can include fixed components that are not physically removable from the client computer (e.g., fixed hard drives) as well as removable components (e.g., removable memory cards). The memory 322 allows for random access, in that programs and data may be both read and written.

The network interface 324 is configured to allow the client device 44, 46, 47 to communicate with other computers across a network. The network interface 324 can include one or more of a wired and wireless network adaptor and well as a software or firmware driver for controlling such adaptor.

The display 326 and other user interface components 328 can include a display device, such as a monitor and an input device, such as a keyboard, keypad, mouse, touch-sensitive element of a touch-screen display, or similar device.

Each of the client devices 44, 46, 47 is configured to run a client program 330, such as a web browser 330 or other user agent suitable for communication with the server 40 and configured to display the user interfaces described herein. The client program 330 may reference locally stored data 334, such as cookies, saved login credentials, and similar.

Figure 5:
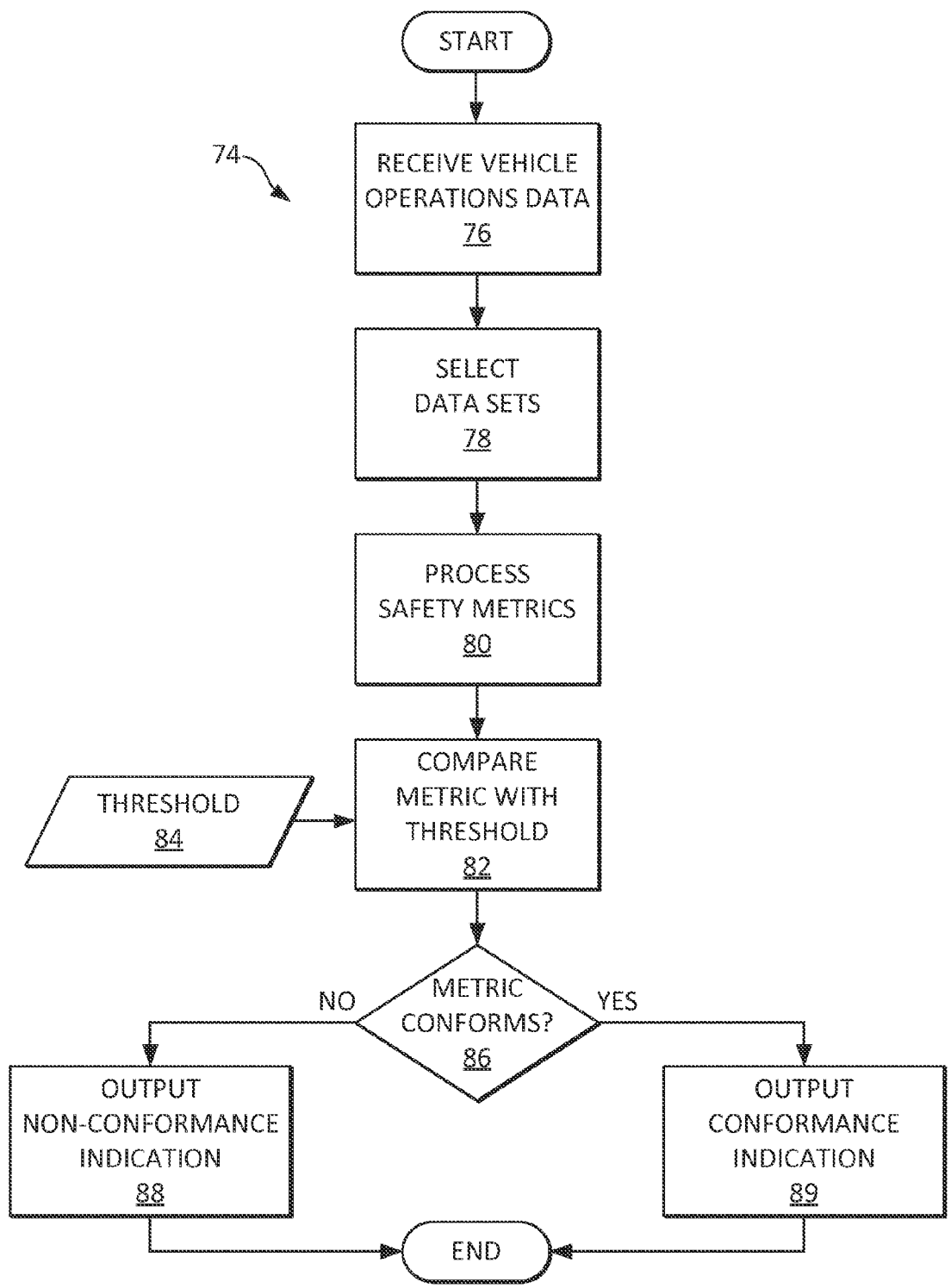
FIG. 5 is a flowchart of a method of monitoring transport vehicle fleet safety.

FIG. 5 illustrates a flowchart of a method 74 of monitoring vehicle fleet safety. The method 74 can be used with the system 20 of FIG. 1 or can be used with other, similar transport vehicle systems. The method 74 is described with reference to the system 20 for convenience and this is not intended to be limiting.

Vehicle operations data is received at the server 42, at 76, from a plurality of data capturing devices installed at a plurality of transport vehicles 22. This can be performed by, for example, uploading operations data from the vehicles 22 directly to the server 42 via a network device 28, 30, by the server 42 querying the third-party data server 32, or in another manner. Depending on the configuration of the server 42 and the data capturing devices, the server 42 can receive the vehicle operations data in batches, such as when the vehicles complete trips, or continuously via wireless or satellite transmission.

At 78, a plurality of data sets is selected from the received vehicle operations data. Each selected data set is representative of the output of one of the different types of sensors. The selected data sets can be a subset of all captured operations data or can be all captured operations data. The data sets selected can be based on the types of sensors, where not all sensors provide data that is needed. Other methodologies for selecting data sets can be employed.

The data sets are then processed, at 80, to obtain different vehicle safety metrics defined by the different types of sensors. In some embodiments, a metric is valid data point of a data set. The most current data point can be selected automatically, while historic data points can be user selectable.

Processing can also include converting a raw value into a unitized value. For example, voltages indicative of vehicle speed can be processed to obtain vehicle speed in mph or km/h. Errors in captured data may also be corrected during the processing performed at 80.

Further to the point of potential errors in captured data or missing data, the processing at 80 can be configured to monitor for erroneous values or missing values and adjusting such values.

Erroneous values can be predetermined values or value ranges, such when a sensor has failed. For example, an engine speed sensor may report a baseline RPM even though it has failed. Missing values may exist if a sensor has not been connected or if a sensor is configured to not report data while failing. Other situations with erroneous and missing data are to be expected.

Erroneous or missing data can be adjusted by, for example, assigning a predetermined value, such as "0", "−1", or "NULL", to a value determined to be missing or erroneous. In another example, a missing or erroneous value can be adjusted by assigned the value of a past non-erroneous value.

Adjusting values in this way promotes data accuracy by tracking how often missing/erroneous values are reported for a given metric within a given grouped or filtered data set. For example, if there are 200 readings used for generating an average for a given metric for a selected week, and ten of the transactions are missing or suspect, then the amount of data adjusted is determined to be 5% (i.e., 10/200=5%). If a metric requires two or more values from two or more sensors (e.g., MPG), then the amount of data adjusted takes this into account by considering the calculated value (e.g., MPG) to be missing or erroneous when any one or more of the values of the contributing sensors is missing or erroneous.

When the timeframe for reporting an amount of data adjusted is predetermined (i.e., fixed or infrequently selected), values for the amount of data adjusted can be stored separately from the respective metric. When the timeframe for reporting an amount of data adjusted is more variable (e.g., frequently selected as different timeframes), values for the amount of data adjusted need not be stored and can be calculated as needed.

Figure 13:
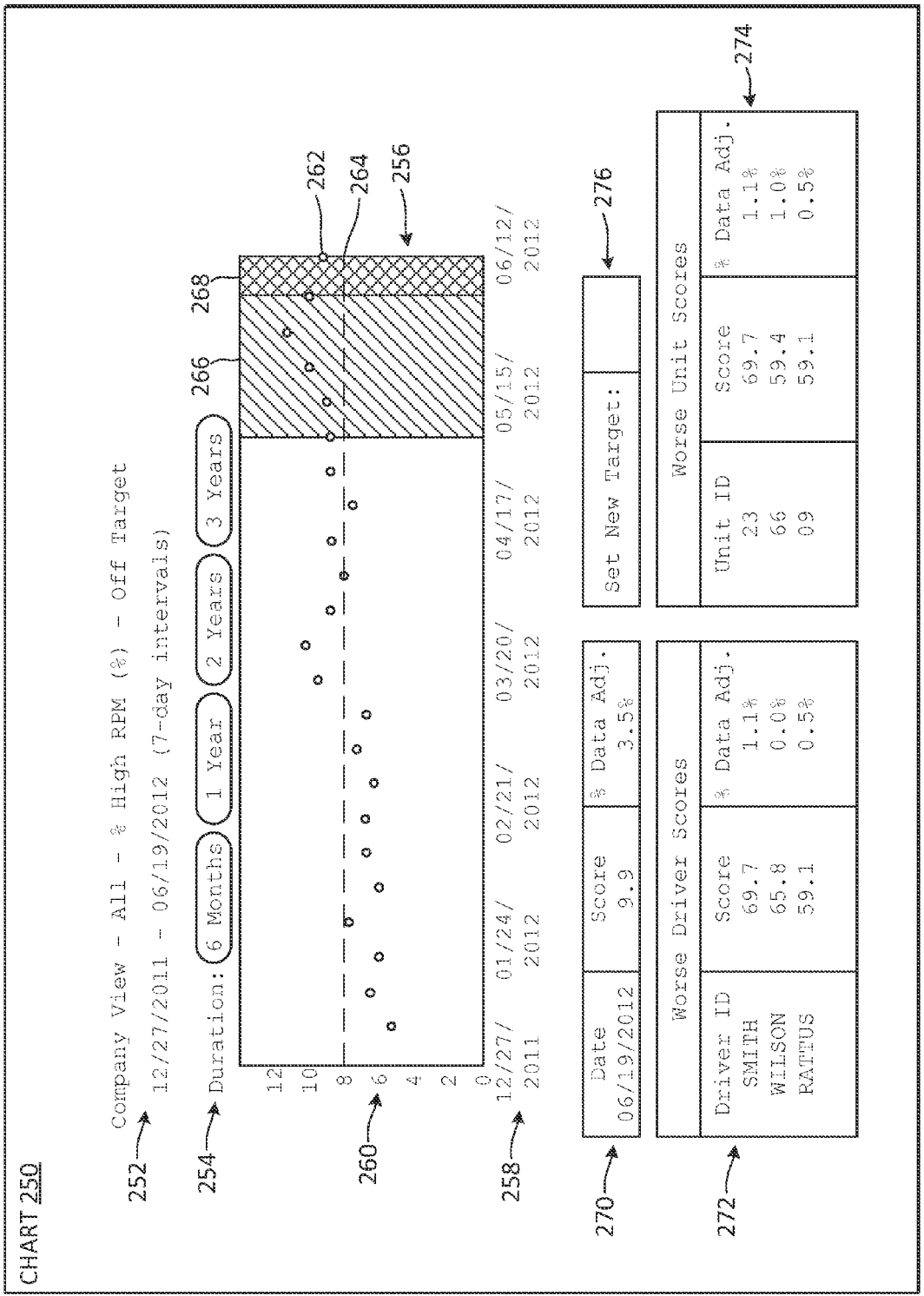
FIG. 13 is a diagram of a user interface of a chart of a metric.

Adjusting erroneous or missing values is advantageous in that a level of confidence in the metric can be established (see FIG. 13). Moreover, adjusting erroneous or missing values may be particularly important when using data from various different sources, whose levels of reliability may not be consistent or acceptable.

In addition, an amount (percentage) of data adjusted for a unit, driver, or other entity can be treated as a metric and can be used in generating combined representations as discussed elsewhere herein. For example, a combined representation for vehicle maintenance may be configured to include a metric for an amount (percentage) of data adjusted so that missing or erroneous data becomes a fleet maintenance concern, in that sensors or data capturing devices may be malfunctioning and may need repair or replacement.

Processing can also include converting one or more data sets to the common format.

Next, at 82, at least one of the vehicle safety metrics is compared to a threshold 84 that is specifically configured for the vehicle safety metric. At 86, when the vehicle safety metric does not conform to the threshold 84, the server 42 outputs, at 88, an indication of non-conformance, which can be provided to one or more of the client devices 44, 46, 47 for display. When the vehicle safety metric conforms to the threshold 84, the server 42 outputs, at 89, an indication of conformance, which can be provided to one or more of the client devices 44, 46, 47 for display. Users of the client devices 44, 46, 47 can thus monitor for non-conforming (or conforming) safety metrics of the vehicles 22 without having to review all of the operations data.

In some embodiments, the threshold 84 is calculated based on past values of the data set. That is, the threshold fluctuates as the values of the data set change over time. This can advantageously permit drift of the metric over time, so as to compensate for gradual and normal changes in vehicle operations, such as those brought about by seasonal road conditions.

A normal distribution calculated for data within the data set can be used to establish a changing threshold 84. The normal distribution can be configured to reduce the change of false alarms, while still providing responsiveness to metrics that need attention. Such a threshold 84 may be known as an off-normal threshold. In some embodiments, one or more statistical process control (SPC) or modified SPC techniques can be used.

In other embodiments, the threshold 84 is a static user-configurable off-target threshold. This kind of threshold is a fixed value that does not change over time, unless updated by a user.

Figure 6:
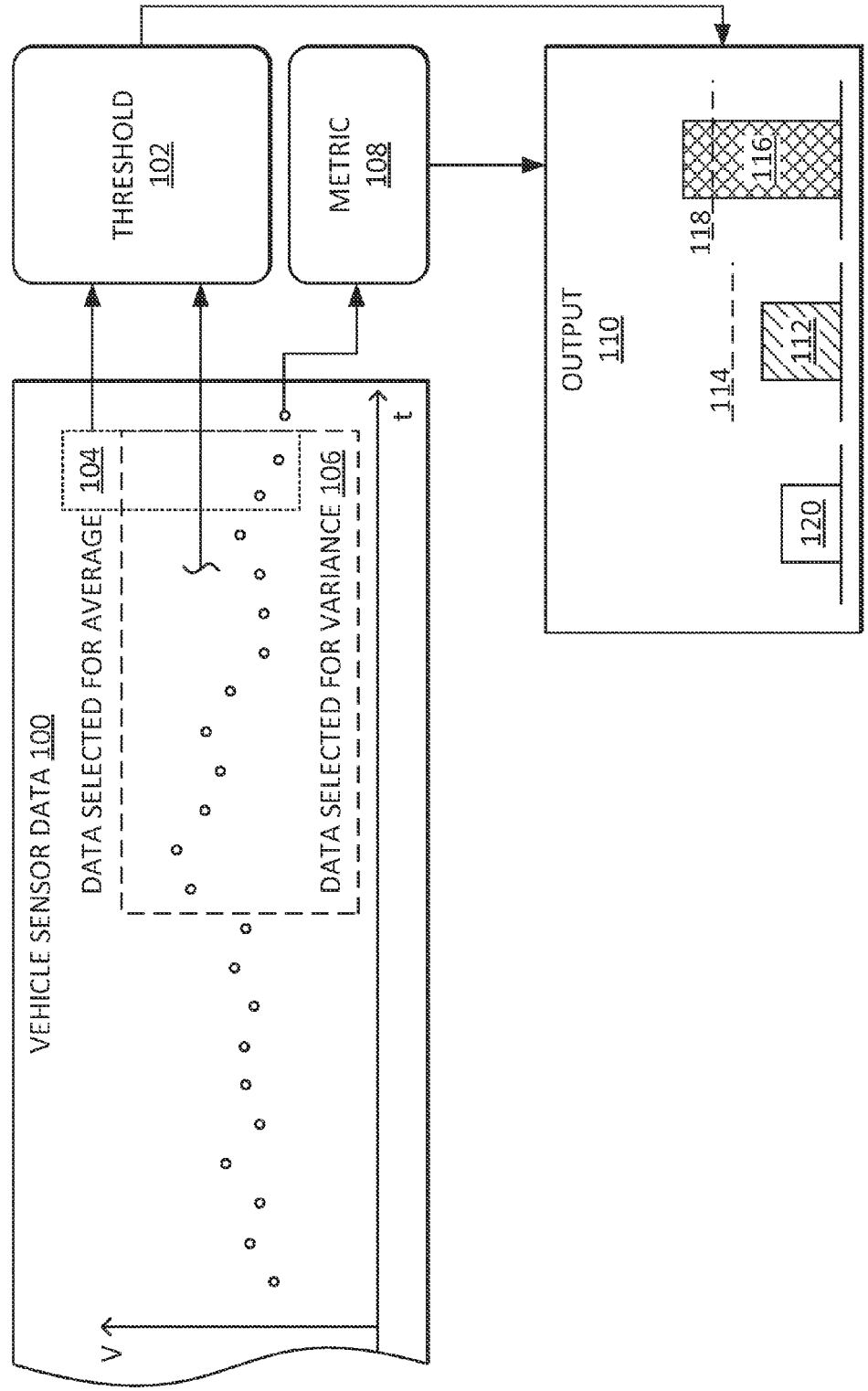
FIG. 6 is a diagram illustrating an off-normal determination.

FIG. 6 shows a schematic diagram related to the method 74 when using a threshold based on a normal distribution.

A data set of time-based vehicle data as captured by a sensor and provided to the server 42 is indicated at 100. The data set 100 may record values, V, versus time, t.

The threshold 84 is calculated to be an offset from an average value of the data set 100. The offset corresponds to a deviation, which is also calculated from the data set 100. The average value is calculated from a first set 104 of past values of the data set 100, and the deviation is calculated from a second set 106 of past values of the data set 100. In some embodiments, the second set 106 of past values cover a longer time range than the first set 104 of past values. In some embodiments, the second set 106 of past values can cover a time range at least about seven times as long as the time range covered by the first set 104 of past values, and thus, when data is sampled at an approximately constant frequency, the second set 106 can have at least about seven times the data as the first set 104. Using more data for calculating the deviation than for calculating the average can advantageously result in a more robust and accurate estimate of the true deviation. In other embodiments, the second set 106 of past values covers a time range at least about twelve times as long as the time range covered by the first set 104 of past values. In still other embodiments, the second set 106 of past values covers the time range in which data has been recorded.

In some embodiments, the deviation is three standard deviations. Acceptable values of metrics thus fall within these limits:

$$a = \hat{\mu} \pm 3\hat{\sigma} \quad (1)$$

where a is an acceptable value,
$\hat{\mu}$ is the average, such as a median, as based on a normal distribution, as determined by the first set 104 of past values, and
$\hat{\sigma}$ is the standard deviation based on the normal distribution, as determined by the second set 106 of past values.

In other embodiments, a mean or mode can be used for the average.

For metrics that should fall below a threshold, the following upper limit applies:

$$a_{high} = \hat{\mu} + 3\hat{\sigma} \quad (2)$$

Equation 2 thus governs metric values that are to remain below an upper limit, and any value of a metric above this limit is considered off-normal and should be indicated as problematic.

For metrics that should be above a threshold, the following lower limit applies:

$$a_{low} = \hat{\mu} - 3\hat{\sigma} \quad (3)$$

Equation 3 thus governs metric values that are to remain below a lower limit, and any value of a metric below this limit is considered off-normal and should be indicated as problematic.

The value of the metric itself, indicated at 108, can be the most recent value of the data set 100. In this embodiment, the most recent value of the data set 100 is not included in the first and second data sets 104, 106 used to calculate the average and deviation.

Output of the metric 108 and its relationship with its threshold 102 can be as shown at 110. In some embodiments, a metric can be graphically indicated as a bar 112 with a predetermined visual characteristic (e.g. color or shading) when conforming to the respective threshold 114. A different visual characteristic can be provided when the metric, at 116, does not conform to the threshold 118. A metric that is not provided with a threshold can be given yet a different visual characteristic, at 120.

Figure 7:
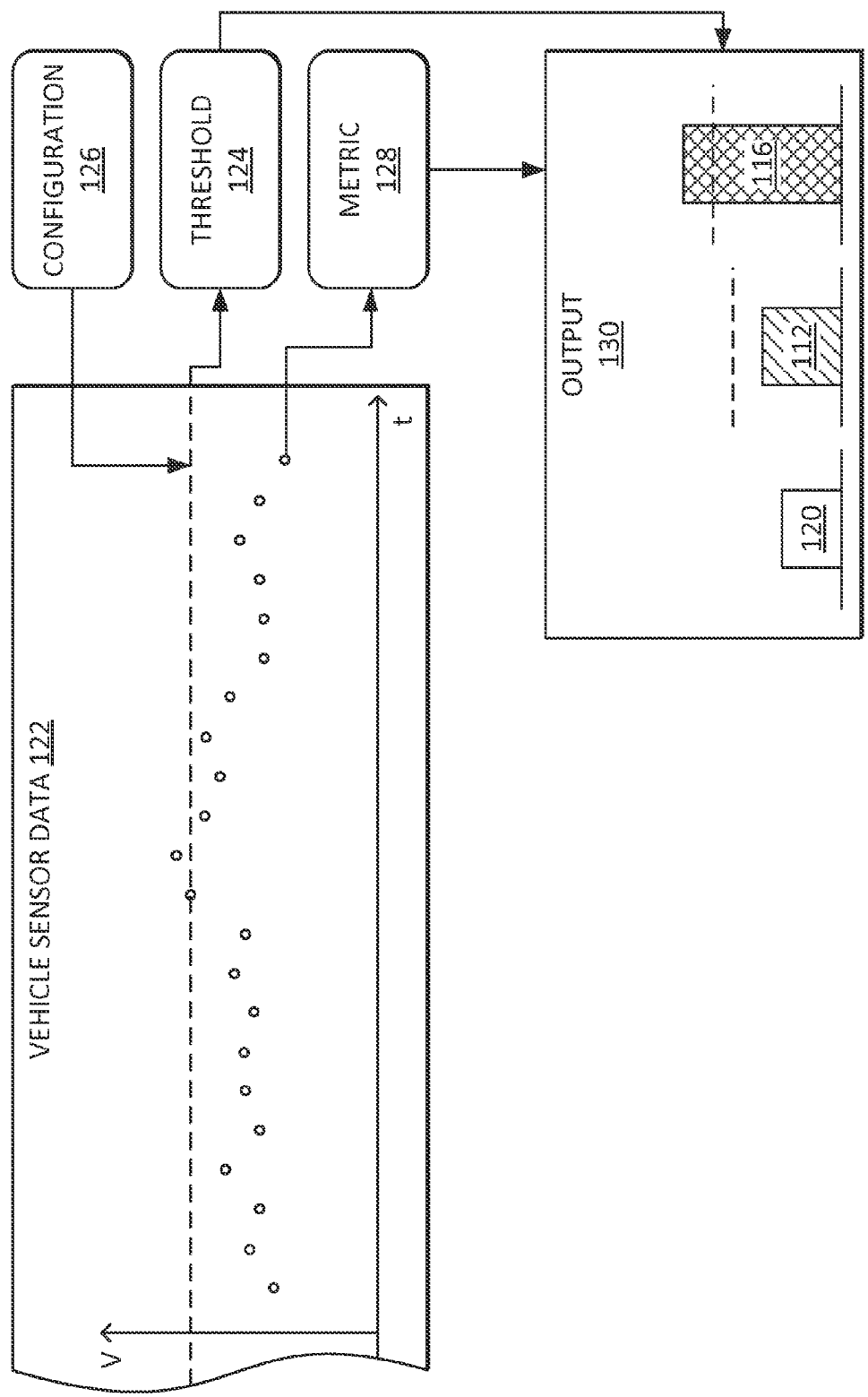
FIG. 7 is a diagram illustrating an off-target determination.
Figure 9:
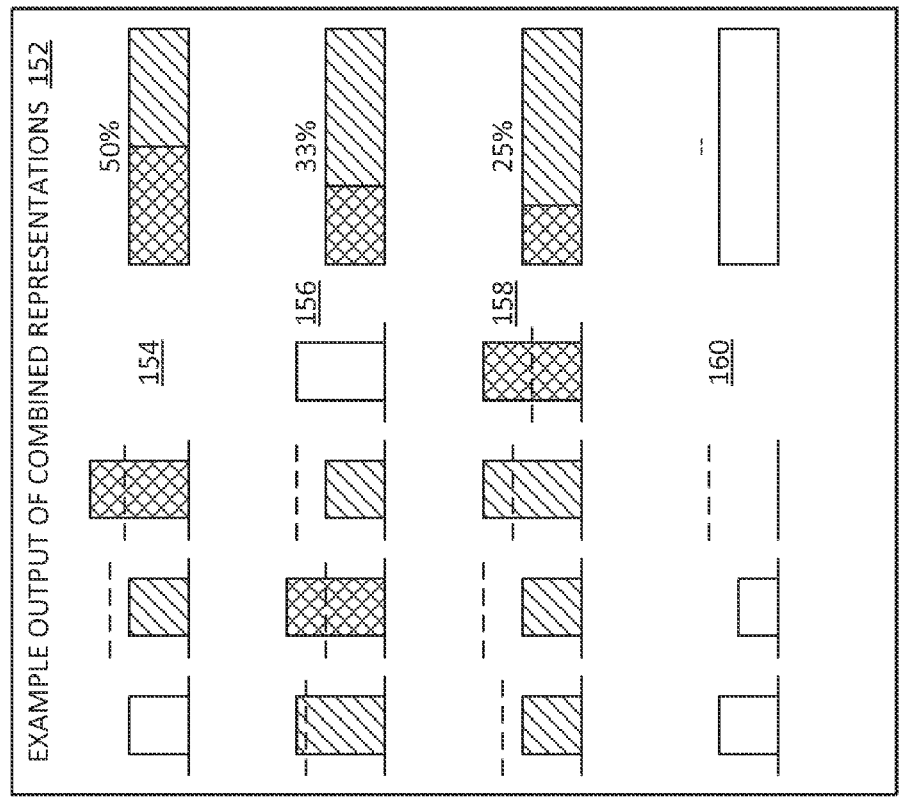
FIG. 9 is a diagram showing example combined representations.

FIG. 7 shows a schematic diagram related to the method 74 when using a user-configurable off-target threshold.

A data set of time-based vehicle data as captured by a sensor and provided to the server 42 is indicated at 122. The data set 122 may record values, V, versus time, t.

A static threshold 124, which does not change based on past values of the data set 122, is controlled by a user configuration 126, such as a user interface element that allows input of a value for the threshold 124. The threshold 124 can further be configured, at 126, to be a high limit or a low limit depending on the nature of the metric.

The value of the metric itself 128 can be the most recent element of the data set 122.

Output 130 of a metric and its relationship to the respective threshold can be as discussed with respect to FIG. 6.

Figure 8:
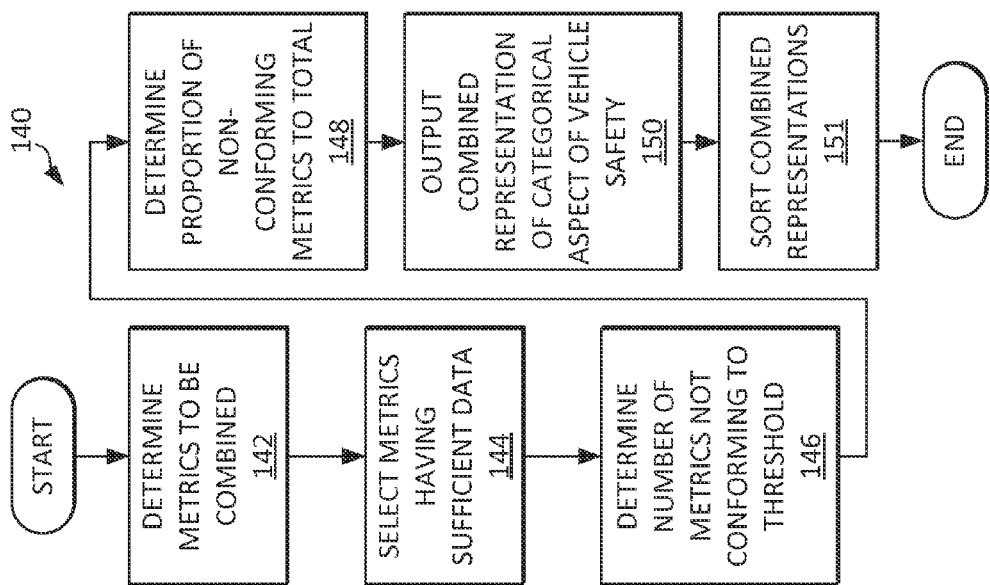
FIG. 8 is a flowchart showing a method of using metrics to determine a combined representation of a categorical aspect of vehicle safety.

FIG. 8 shows a flowchart of a method 140 of using metrics to obtain a combined representation of a categorical aspect of vehicle safety. At least two different metrics can be combined to form a larger indicator of an aspect of vehicle safety. For example, a tire pressure metric and an engine speed metric, based on data from the respective types of sensors, can be combined to form a combined representation of a maintenance aspect.

Combined representations of different categorical aspects of vehicle safety can include management oversight of vehicle operations, vehicle maintenance, driver behaviour (e.g., hours of service), vehicle fuel consumption, unsafe driving, regulatory compliance, and vehicle dispatch information.

At 142, at least two metrics to be combined are determined. The metrics can be preselected and their data can be obtained. The data sets selected for a given aspect of vehicle safety are configurable such that different combined representations of a same aspect of vehicle safety are possible. This is advantageous, since one fleet operator may want to include a metric that another fleet operator chooses to ignore.

At 144, of the metrics determined to contribute to the combined representation, those that have sufficient data and selected. In some embodiments, sufficient data is enough data to determine an off-normal threshold, when used, and a recent data point for comparing to the threshold. A threshold also has to be set or active in order for a metric to be considered to be usable.

Next, at 146, the number of metrics determined to not conform to their respective thresholds is determined. Each metric is compared to its threshold and determined as conforming or not conforming. The number of non-conforming thresholds is then tallied.

The combined representation is then determined, at 148, to be a proportion of a number of the vehicle safety metrics determined to not conform to the respective threshold to a total number of the vehicle safety metrics determined to have sufficient data. This is a linear proportion. In other embodiments, a non-linear proportion can be used with, for example, different metrics having different weighting factors. In some embodiments, a non-linear proportion uses logarithmically determined weighting factors.

At 150, the combined representation is output.

When steps 142-150 are performed to generate several combined representations for different categorical aspects of vehicle safety, the combined representations can be sorted, at 151. Such sorting can be by descending order from highest to lowest value. For example, the combined representation with highest percentage value comes before the combined representation with the next highest percentage value, and so on.

Examples of the method 140 and its output are shown at 152.

At 154, a first metric does not have a threshold, a second metric has an upper threshold but does not exceed it, and a third metric exceeds its upper threshold. Accordingly the metrics that do not conform to threshold number one and the total number of applicable metrics is two. Thus, the combined representation is an indication of the proportion ½. The combined representation can include a bar that is filled by this amount and a number, such as a percentage.

In the example at 156, a first metric conforms to a lower threshold, a second metric exceeds an upper threshold, a third metric does not exceed an upper threshold, and a fourth metric does not have a threshold configured. Accordingly, one of three metrics does not conform and the proportion indicated by the combined representation is ⅓ or 33%.

In the example at 158, first and second metrics do not exceed their respective upper thresholds, a third metric does not fall below its lower threshold, and a fourth metric exceeds its upper threshold. Accordingly, one of four metrics does not conform and the proportion indicated by the combined representation is ¼ or 25%.

Lastly, in the example at 160, first and second metrics do not have thresholds configured and a third metric has a threshold configured but does not have sufficient data for comparison. Accordingly, the combined representation indicates such with an empty bar and a null value (e.g., "- - - ").

The combined representations of the different categorical aspects of vehicle safety advantageously provide an intuitive indication as to how many of the contributing metrics are non-conforming. The proportion of a bar that is filled or the magnitude of the associated percentage can quickly draw a viewer's attention to a categorical aspect of vehicle safety that requires attention.

Figure 10:
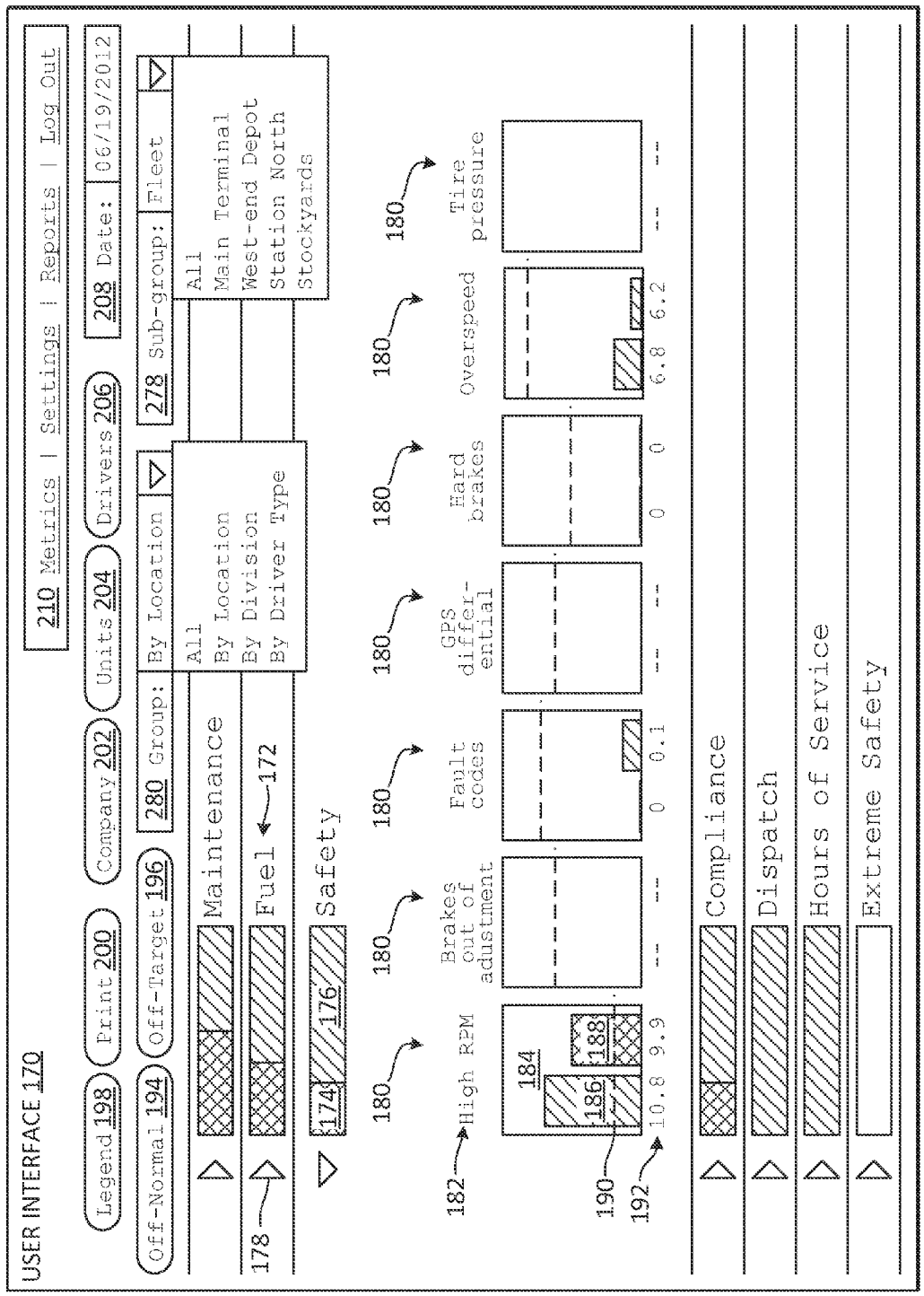
FIG. 10 is a diagram of a user interface showing combined representations.

FIG. 10 illustrates a user interface 170 for displaying vehicle safety metrics and combined representations of categorical aspects of such metrics. The user interface 170 is a dynamic and interactive report.

The user interface 170 displays an array of combined representations 172 for categorical aspects of vehicle operations, such as "Maintenance", "Fuel", "Safety", "Compliance", "Dispatch", "Hours of Service", and "Extreme Safety", to name some examples. Each categorical aspect may include one or more metrics that have been selected to be contributing factors to the aspect. For example, the categorical aspect "Maintenance" may include metrics for tire pressure and fault codes. In some embodiments, all of the categorical aspects may be directed to safe operation of the fleet, so that the user interface 170 is primarily directed towards safety.

The array of combined representations 172 can be arranged in vertically stacked panels, such that each of the combined representations 172 is in its own panel.

In the embodiment illustrated, each combined representation 172 includes a colored or shaded bar that is, for example, linearly filled according to the proportion of the number of non-conforming metrics to the total number of metrics having sufficient data, as discussed above. A first portion 174 of the bar represents the number of non-conforming metrics and a section portion of the bar 176 represents the total number of metrics with sufficient data. In this example, the bars are horizontal. In other examples the bars can be vertical. In other embodiments, different shapes and filling techniques can be used instead of linearly filled or shaded bars. For example, a pie chart can include two differently shaded segments: one for non-conforming metrics and another for total metrics. In still other embodiments, only a numerical value, e.g., percentage, is displayed. A viewer can thereby quickly and readily ascertain which aspects are in need to attention. In the example illustrated, it is clear that the "Maintenance" aspect is in greater need of attention than, say, the "Hours of Service" aspect.

The array of combined representations 172 can also be sorted based on the magnitudes of each aspect (i.e., the proportion that each bar is filled). As illustrated, the array of combined representations 172 is sorted in descending order, with the aspects having higher proportions being located above those having lower proportions. This can further reduce the time and effort required by the viewer to determine which aspects of vehicle safety have the most non-conforming metrics and thus demand the most attention.

The user interface 170 also includes drill-down interface elements 178 associated with the combined representations 172. The user interface 170 is configured so that when a drill-down interface element 178 is activated, the display area of the associated combined representation 172 is expanded to display the contributing metrics, which are otherwise hidden.

In the example illustrated, the drill-down interface element 178 of the "Safety" aspect has been activate to reveal metrics 180, such as "High RPM", "Brakes out of adjustment", "Fault codes", "GPS Differential", "Hard brakes", "Overspeed", and "Tire pressure". Metrics 180 can be added and removed from the aspect, as will be discussed below.

Each of the metrics 180 includes a textual indicator 182, a plot area 184, data bars 186, 188, a threshold line 190, and numerical values 192.

The textual indicator 182 is configured to display the name of the metric 180.

The plot area 184 is configured to depict the data bars 186, 188, which in this embodiment respectively represent the average value for the metric over a past time period and the current value of the metric 180. That is, the height of the bar 186 represents the average value for the metric over, for example, the past four samples prior to the most current value, while the height of the bar 188 represents the most current value of the metric 180. This can allow the viewer to quickly and readily determine whether the current value of the metric is an improvement over past values.

The plot area 184 is further configured to depict the line 190 for the threshold, if set, so that the data bars 186, 188 can be quickly visually compared to the threshold. User interface elements, such as buttons 194, 196, can be configured to toggle the threshold lines 190 between displaying off-normal and off-target thresholds. In this embodiment, the buttons 194, 196 are provided at the user interface 170 to globally control the type of threshold applied to all metrics 180 of all the combined representations 172.

The numerical values 192 of the data bars 186, 188 are displayed below the plot area 184 to give the viewer a more accurate sense of the metric.

The user interface 170 can further include other user interface elements. Buttons 198, 200 can be provided for displaying a legend for the metrics 180 and/or combined representations 172 and printing an image of the user interface 170. Buttons 202, 204, 206 can be provided and configured to filter and/or present the data contributing to the metrics 180, and thus to the combined representations 172, to be limited to views based on the company, units, drivers, or the like. In one example, the button 202 averages data for the entire company (or fleet) to calculate company-wide metrics (e.g., averages), while the buttons 204, 206 present a list of individual metrics for different units and drivers respectively. A date selector 208 can also be provided and configured to filter the data contributing to the metrics 180, and thus to the combined representations 172, to be limited to a particular date or range of dates. In addition, navigation links 210 can be provided to navigate to different user interfaces for configuring, outputting, and performing processing other on the combined representations 172 and metrics 180.

The user interface 170 can further include a group configuration element 280, such as a dropdown selector, to group the metrics and thus the combined representations 172, resulting from the selection made at buttons 202, 204, 206. The group configuration element 280 is configured to group by different selections for each of the company, units, and drivers as determined by a press of one of the buttons 202, 204, 206. In the example shown in FIG. 10 with the company view (button 202) selected, the group configuration element 280 is configured to group by "All" (i.e., the entire company or fleet), by location, by division, or by type of driver. A sub-group configuration element 278, such as a dropdown selector, is provided to further group the metrics, and thus the combined representations 172, resulting from the selection made at the group configuration element 280. In this example, grouping by location is selected at element 280 and thus various locations are selectable at element 278.

Generally, the combined representations can be filtered and grouped according to any reporting criteria. Metrics can be mathematically combined (e.g., company-wide averages) or kept as individual metrics (e.g., specific to different units or drivers) and aggregated into a view. Any time period for which there is data can be selected at date selector 208. A static report containing the filtered and grouped combined representations can then be generated, as will be discussed below. This advantageously allows monitoring of groups and/or sub-groups within a fleet, with such groups and/or sub-groups being defined by geography, types of drivers, divisions to which drivers or equipment are assigned, or any other category important to the company.

Grouping can be configured in several ways. In one example, data is averaged, so that combined representations represent averages. This is depicted in FIG. 10. In another kind of grouping each combined representation remains based on individual drivers, units, or similar, and combined representations for a group of drivers or units are aggregated into a single, sorted list. This will be discussed below with respect to FIG. 16.

Figure 11:
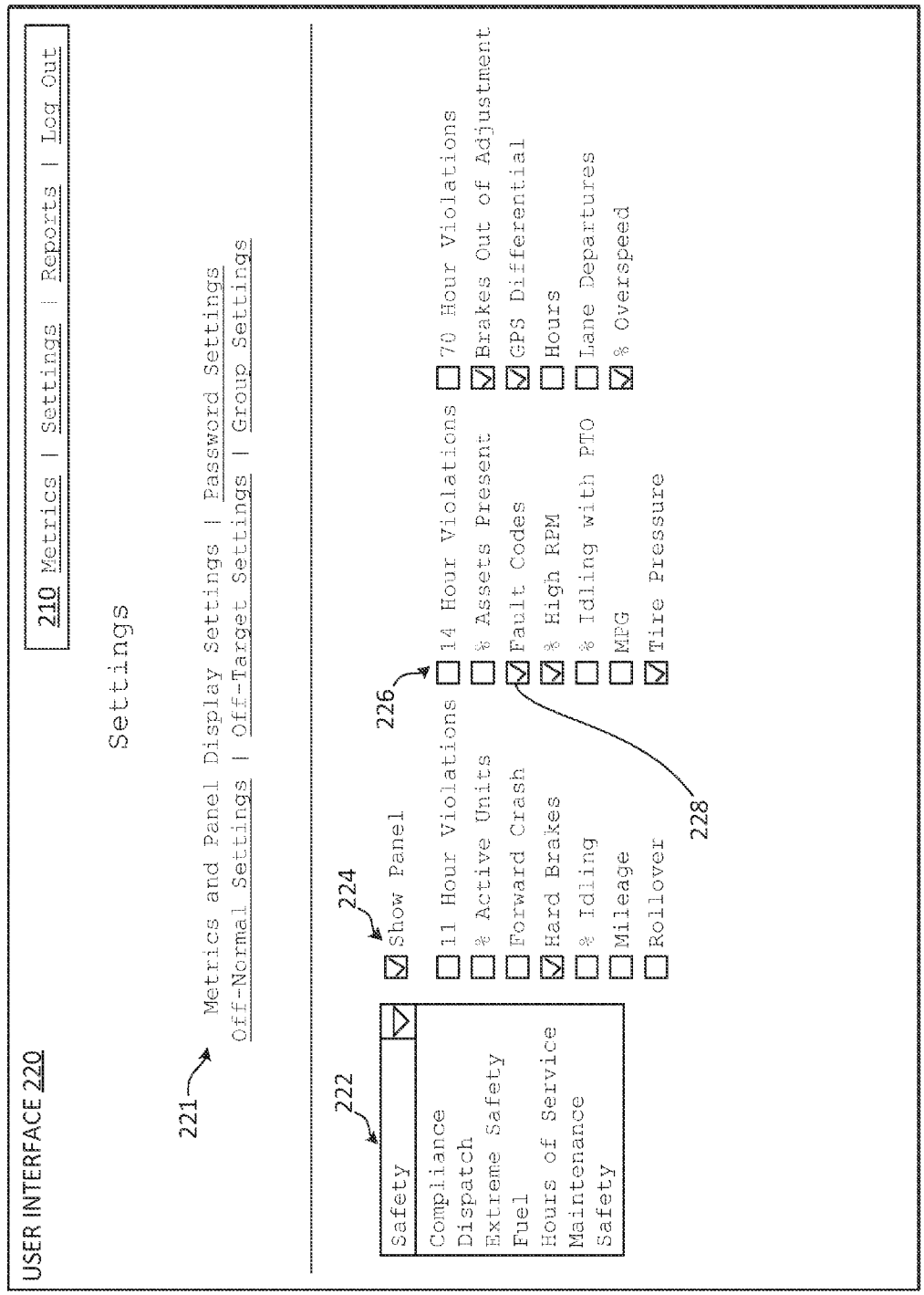
FIG. 11 is a diagram of a user interface showing configuring combined representations.

FIG. 11 illustrates a user interface 220 for configuring the combined representations of categorical aspects of vehicle safety. The user interface 220 can also be configured for changing other settings and thus can also include navigation links 221 to assist with such.

The user interface 220 includes user interface elements 222, 224, 226 for configuring the combined representations 172 displayable at the user interface 170 of FIG. 10.

The user interface element 222, which can be a dropdown selector or the like, allows selection of a combined representation 172 to configure.

The user interface element 224, which can be a checkbox or the like, allows selection of whether the combined representation 172 selected at the dropdown selector 222 is to be displayed at the user interface 170 of FIG. 10. This advantageously allows the user interface 170 to be customized to display different combined representations 172 to different individuals within an organization.

The user interface elements 226, which can each be a checkbox or the like, allow selection of the data sets of metrics that are to contribute to the combined representation 172 selected at the dropdown selector 222. That is, when a checkbox 226 is checked, the associated metric (e.g., "Hard Brakes") is selected to contribute to the selected combined representation 172 (e.g., "Safety"). Likewise, when a checkbox 226 is unchecked, the associated metric (e.g., "% Idling") is deselected and thus does contribute to the selected combined representation 172 (e.g., "Safety"). In this way, previously selected metrics can be removed from the combined representation.

When any of the metrics is selected or deselected by way of the respective checkbox 226, the underlying data sets are combined into the combined representation and displaying at the user interface 170 in a dynamic manner.

Figure 12:
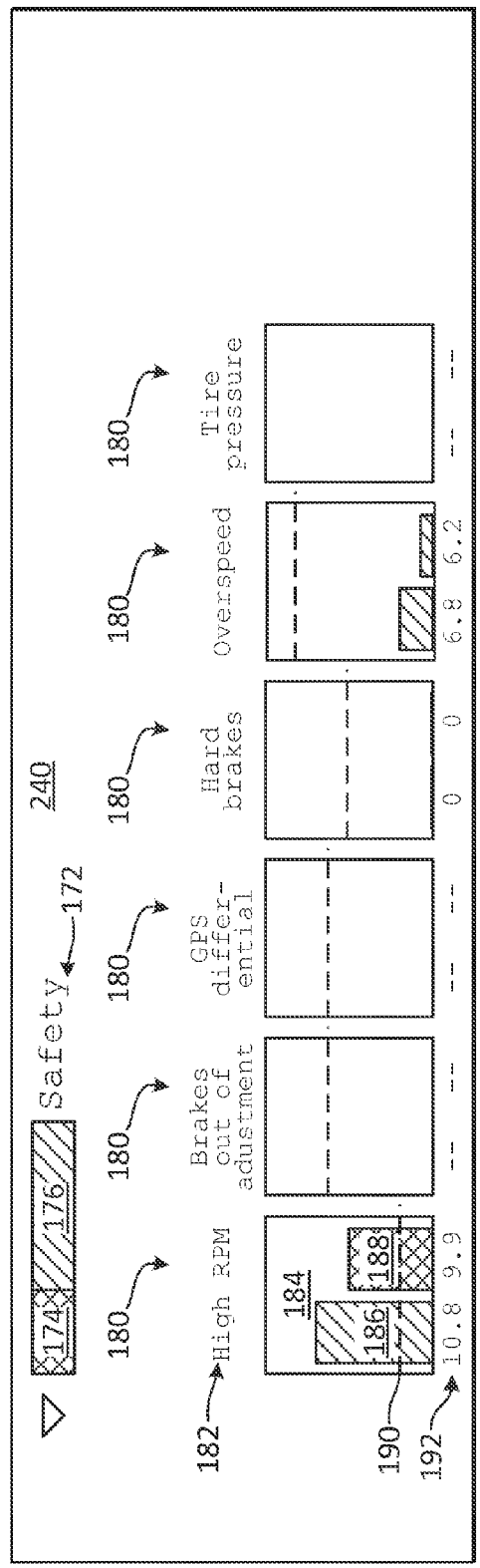
FIG. 12 is a diagram of a panel of the user interface of FIG. 10 showing a dynamic update of a combined representation.

For example, if the "Fault Codes" metric is deselected at 228, then the user interface is dynamically updated, as shown by the updated panel 240 of FIG. 12, to display the combined representation 172 for "Safety" as without the "Fault Codes" metric 180. The value of proportion of the combined representation 172 is updated and displayed as having no contribution from the "Fault Codes" metric 180.

It can be seen when comparing FIGS. 10 and 12, that the combined representation 172 for the aspect of "Safety" increases from ¼ (25%) to ⅓ (33%) when the "Fault Codes" metric 180 is removed. This is because the "Fault Codes" metric 180 conformed to its threshold, and its removal adds greater weight to the "High RPM" metric 180 that does not conform to its threshold.

FIG. 13 illustrates a chart 250 of a data set for a metric. The chart can be displayed in response to, for example, user selection of a metric 180 at the user interface 170 of FIG. 10.

The chart 250 includes an indication 252 of the data set and data range, as well as user interface elements, such as buttons 254, configured to select different date ranges. In this example, the indication 252 of the data set is "Company View-All- % High RPM (%)-Off Target", which corresponds to the company view of FIG. 10 when all is selected at the group and sub-group configuration elements 280, 278, the "High RPM" metric 180 is selected, and the off-target threshold is selected (at button 196 of FIG. 10). A plot area 256 bound by a time axis 258 and a value axis 260 contains data points of the data set of the metric. The value of the metric can be the most recent data point 262. The threshold 264 can be displayed as a line in the plot area 256. Two regions 266, 268 of the plot area 256 are configured to correspond to the data bars 186, 188 (FIG. 10) to respectively represent the average value for the metric over a past time period and the current value of the metric 180. Each of the regions 266, 268 can be provided with the same coloring or shading as the respective data bar 186, 188.

Further information can be provided by the chart 250 including a numerical value of the metric for the current date at 270, a listing 272 of the drivers for whom the charted metric is most out of conformance with the threshold, and a listing 274 of units for whom the charted metric is most out of conformance with the threshold. The metric for the current date 270 and listings of drivers and units 272, 274 can include an indication of the amount of data that has been adjusted (shown as "% Data Adj."), which can advantageously provide a confidence level for the data as well as indicate whether any of the data capturing devices may be malfunctioning.

In addition, a user interface element 276, such as a textbox with an update button, can be provided for user entry of a new static off-target threshold, if such type of threshold is used.

Figure 14:
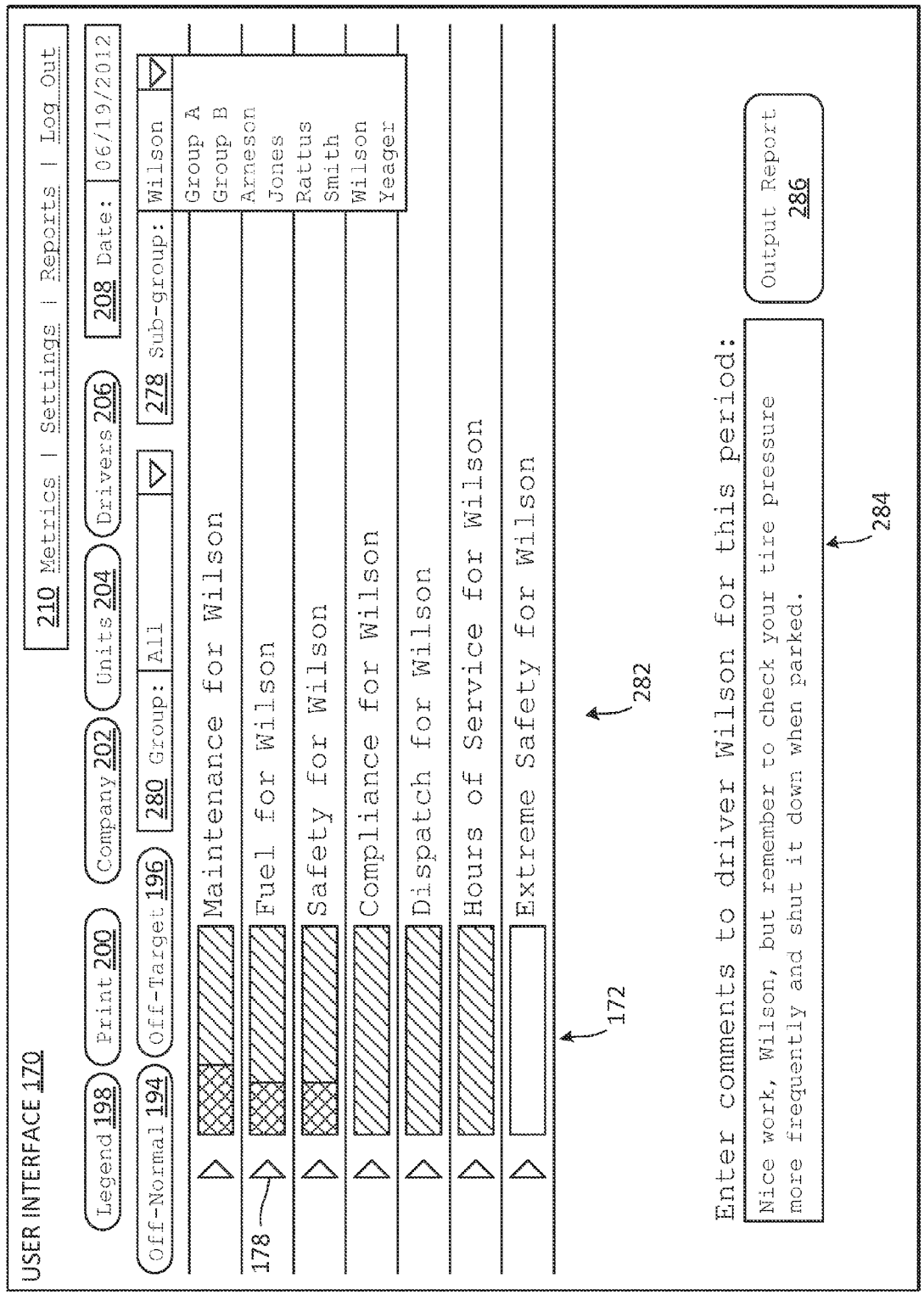
FIG. 14 is a diagram of the user interface configured to filter output of combined representations.

FIG. 14 illustrates the user interface 170 at a state after the button 206 for filtering by driver has been pressed. The group configuration element 280 and sub-group configuration element are thus configured to group the metrics and the combined representations 172 to a selected driver or a group of drivers that can be defined by user. The grouped combined representations are indicated at 282 for an individual driver or group of drivers, where the drivers are organized into groupings. The example of FIG. 14 shows filtering by a single driver, "Wilson."

Also shown in FIG. 14 is a user interface element, such as a textbox 284, for receiving manual input of a comment related to the combined representations 172 displayed. Another user interface element, such as a button 286, outputs data of the combined representations 172 to a static report, along with the manually entered comment at 284.

As mentioned above with reference to FIG. 10, the combined representations can be filtered according to any reporting criterion, such as driver, unit, vehicle, company division, entire fleet (company), or the like, as selected by buttons 202, 204, 206 and dropdown selector 280. Any time period for which there is data can be selected at date selector 208. A static report containing the filtered combined representations can then be generated, as triggered by a press of the button 286. The report is directly mapped to the data shown in the user interface 170, such that any active filters in the user interface 170 are also applied to the report. The generated report is then output, along with comments 284.

FIG. 15 shows an example of a static report 290 that can be generated at the user interface 170. The static report 290 is of the kind that can be printed and provided to a driver. The report 290 includes period, driver, and equipment data 292. The report 290 further includes metrics for the driver as well as fleet averages of such metrics. Lastly, the report 290 includes a comment field 296 for any manually entered comment provided when generating the report 290 (See FIG. 14).

In some embodiments, when a report is generated by, for example, the user interface 170, any comment provided in the comment field 284 (FIG. 14) is date stamped with the date that the report is generated. Such a date stamp 298 (FIG. 15) can be output with the static report 290 as appended to the comment 296 or otherwise in association with the comment. In other embodiments a timestamp or other indicative code is applied to the report. This advantageously allows a third party, such as an insurance company, to confirm that the report was generated using the techniques described herein, and therefore that the report is accurate.

Figure 16:
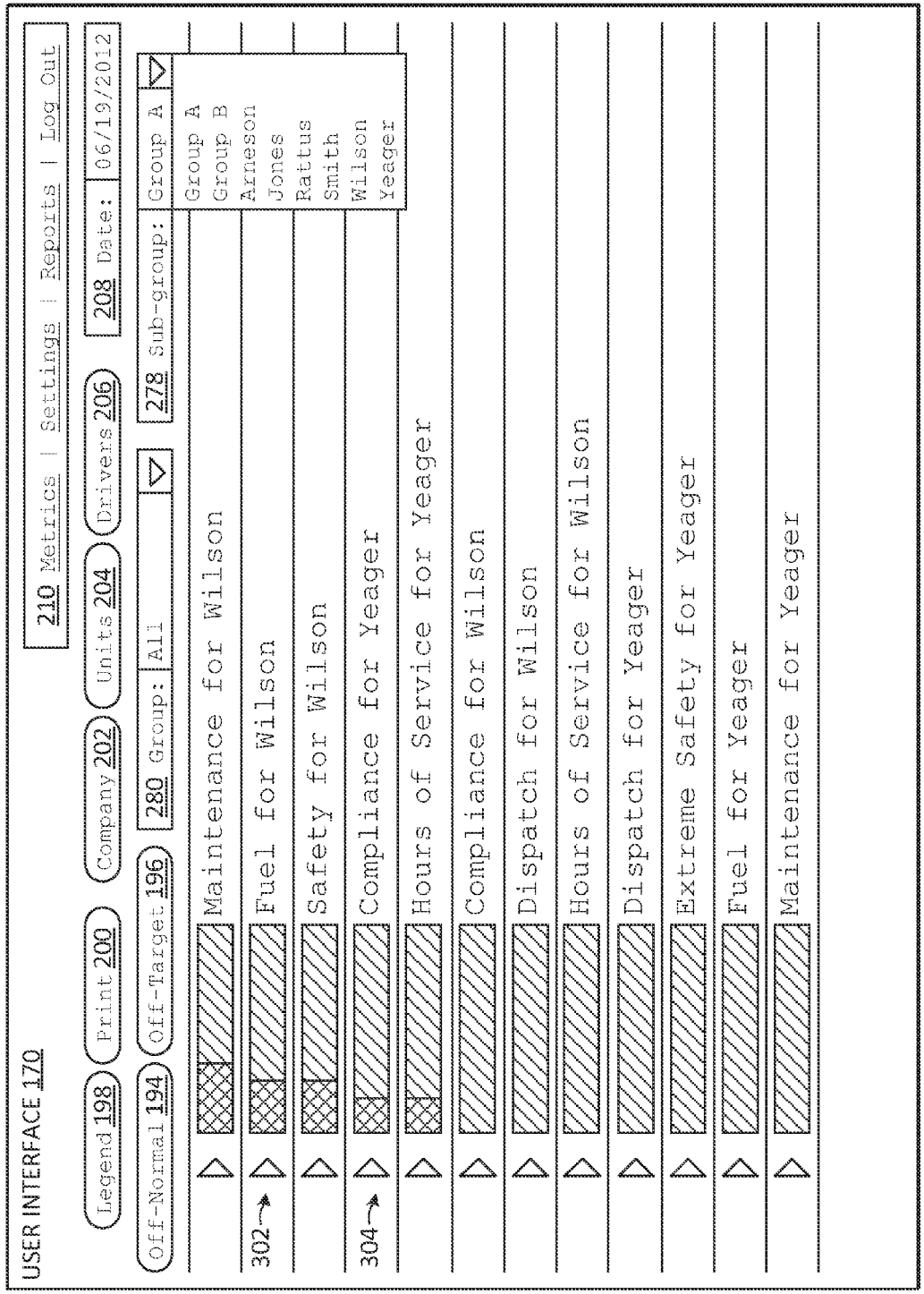
FIG. 16 is a diagram of the user interface configured to filter output of combined representations based on groups.

FIG. 16 shows the user interface 170 with a group of drivers selected by the sub-group configuration element 278. In this example, driver "Group A" includes the drivers "Wilson" and "Yeager." This kind of grouping, as shown, results in output of distinct combined representations for the drivers of the group. The combined representations are sorted in descending order, so that one driver's combined representations, at 302, are intermingled with those of one or more other drivers, at 304. This can advantageously allow a manager of a group of drivers to determine which drivers are most in need of assistance or training, as well as the subject of such (e.g., "maintenance", "fuel", etc).

Thus, it can be seen from the above, that the present disclosure teaches intuitive and highly customizable systems and methods for processing, analyzing, and reporting transport vehicle fleet safety data, which may originate from several different data sources, using metrics and their combined representations.

The techniques described in this disclosure can also be applied to other aspects of transport and trucking aside from safety, such as monitoring fuel usage, monitoring customer satisfaction, and the like. Further, the techniques described in this disclosure can also be applied to other industries, such as healthcare. This can be achieved by recognizing that transport trucks are analogous to different pieces of hospital equipment, drivers are analogous to healthcare practitioners, and terminals or divisions are analogous to various care units within the hospital.

While the foregoing provides certain non-limiting example embodiments, it should be understood that combinations, subsets, and variations of the foregoing are contemplated. The monopoly sought is defined by the claims.

What is claimed is:

1. A method of monitoring transport vehicle fleet safety, the method comprising:
receiving vehicle operations data from a plurality of data capturing devices installed at a plurality of transport vehicles, the vehicle operations data representative of sensor output captured by the data capturing devices;
selecting a plurality of data sets from the vehicle operations data, the plurality of data sets representative of output of different types of sensors;
processing the plurality of data sets to obtain different vehicle safety metrics defined by the different types of sensors;
comparing at least one of the vehicle safety metrics to a threshold configured for the vehicle safety metric, the threshold being calculated based on past values of the data set on which the vehicle safety metric is based, the threshold being offset from an average value by a deviation, the average value being calculated from a first set of past values of the data set, the deviation being calculated from a second set of past values of the data set, and the second set of past values covering a longer time range than the first set of past values; and
when the compared vehicle safety metric does not conform to the threshold, outputting an indication of non-conformance to a manager device associated with a manager of fleet drivers of the transport vehicle fleet;
the indication of non-conformance configured for safety analysis of past operation of at least one transport vehicle of the fleet for oversight by management and feedback to at least one fleet driver of the at least one transport vehicle.

2. The method of claim 1, wherein the threshold is based on a normal distribution calculated for data within the data set on which the vehicle safety metric is based.

3. The method of claim 1, wherein the second set of past values covers a time range at least about seven times as long as the time range covered by the first set of past values.

4. The method of claim 1, wherein the vehicle operations data is received in multiple different formats from multiple disparate data sources, wherein the processing comprises converting the vehicle operations data to a common format.

5. A method of monitoring transport vehicle fleet safety, the method comprising:
receiving vehicle operations data from a plurality of data capturing devices installed at a plurality of transport vehicles, the vehicle operations data representative of sensor output captured by the data capturing devices;
selecting a plurality of data sets from the vehicle operations data, the plurality of data sets representative of output of different types of sensors;
processing the plurality of data sets to obtain different vehicle safety metrics defined by the different types of sensors;
comparing at least one of the vehicle safety metrics to a threshold configured for the vehicle safety metric, the threshold being calculated based on past values of a respective data set of the plurality of data sets on which the vehicle safety metric is based, the threshold being offset from an average value by a deviation, the average value being calculated from a first set of past values of the respective data set, the deviation being calculated from a second set of past values of the respective data set, and the second set of past values covering a longer time range than the first set of past values;
when the compared vehicle safety metric does not conform to the threshold, outputting an indication of non-conformance to a manager device associated with a manager of fleet drivers of the transport vehicle fleet, the indication of non-conformance configured for safety analysis of past operation of at least one transport vehicle of the fleet for oversight by management and feedback to at least one fleet driver of the at least one transport vehicle; and
combining at least two of the vehicle safety metrics to obtain a combined representation of a categorical aspect of vehicle safety, the combined representation of the categorical aspect of vehicle safety defined by the types of sensors associated with the combined vehicle safety metrics.

6. The method of claim 5, wherein selection of the plurality of data sets is configurable to define different combined representations of a same categorical aspect of vehicle safety.

7. The method of claim 5, wherein combining the at least two vehicle safety metrics comprises determining the combined representation to be a proportion of a number of the vehicle safety metrics determined to not conform to the respective threshold to a total number of the vehicle safety metrics determined to have sufficient data.

8. A method of displaying categorical aspects of transport vehicle fleet safety, the method comprising:
receiving vehicle operations data from a plurality of data capturing devices installed at a plurality of transport vehicles, the vehicle operations data representative of sensor output captured by the data capturing devices;
displaying a user interface configured to allow selection of a plurality of data sets of the vehicle operations data, the plurality of data sets representative of output of different types of sensors;
processing the selected data sets to obtain different vehicle safety metrics defined by the different types of sensors;
comparing at least one of the vehicle safety metrics to a threshold configured for the vehicle safety metric, the threshold being calculated based on past values of a respective data set of the selected data sets on which the vehicle safety metric is based, the threshold being offset from an average value by a deviation, the average value being calculated from a first set of past values of the respective data set, the deviation being calculated from a second set of past values of the respective data set, and the second set of past values covering a longer time range than the first set of past values;
combining the vehicle safety metrics of the selected data sets into a combined representation of a categorical aspect of vehicle safety;

displaying the combined representation of the categorical aspect of vehicle safety in the user interface; and when the compared vehicle safety metric does not conform to the threshold, outputting an indication of non-conformance to a manager device associated with a manager of fleet drivers of the transport vehicle fleet, the indication of non-conformance configured for safety analysis of past operation of at least one transport vehicle of the fleet for oversight by management and feedback to at least one fleet driver of the at least one transport vehicle;

wherein combining the vehicle safety metrics of the selected data sets into the combined representation and displaying the combined representation are dynamically performed whenever at least one of the data sets is selected.

9. The method of claim 8, wherein combining the vehicle safety metrics of the selected data sets into the combined representation of the categorical aspect of vehicle safety comprises:

determining the combined representation to be a proportion of a number of the vehicle safety metrics determined to not conform to the respective threshold to a total number of the vehicle safety metrics determined to have sufficient data.

10. The method of claim 8, wherein the vehicle operations data is received in multiple different formats from multiple disparate data sources, wherein the processing comprises converting the vehicle operations data to a common format.

11. The method of claim 8 further comprising removing a vehicle safety metric of a previously selected data set from the combined representation in response to deselection of the previously selected data set.

12. The method of claim 11, wherein removing the vehicle safety metric of the previously selected data set from the combined representation and displaying the combined representation are dynamically performed whenever at least one of the data sets is deselected.

13. The method of claim 8, wherein the user interface is further configured to filter or group the plurality of data sets based on a grouping criterion associated with the plurality of transport vehicles.

14. A method of generating a safety report for transport vehicles, the method comprising:

receiving vehicle operations data from a plurality of data capturing devices installed at a plurality of transport vehicles of a transport vehicle fleet, the vehicle operations data representative of sensor output captured by the data capturing devices;

selecting a plurality of data sets from the vehicle operations data, the plurality of data sets representative of output of different types of sensors;

processing the selected data sets to obtain different vehicle safety metrics defined by the different types of sensors;

comparing at least one of the vehicle safety metrics to a threshold configured for the vehicle safety metric, the threshold being calculated based on past values of a respective data set of the selected data sets on which the vehicle safety metric is based, the threshold being offset from an average value by a deviation, the average value being calculated from a first set of past values of the respective data set, the deviation being calculated from a second set of past values of the respective data set, and the second set of past values covering a longer time range than the first set of past values;

combining the vehicle safety metrics into a plurality of combined representations of different categorical aspects of vehicle safety;

filtering the combined representations according to a reporting criterion;

generating a report containing the filtered combined representations; and outputting the report to a manager device associated with a manager of fleet drivers of the transport vehicle fleet, the report including an indication of non-conformance when the compared vehicle safety metric does not conform to the threshold, the indication of non-conformance configured for safety analysis of past operation of at least one transport vehicle of the fleet for oversight by management and feedback to at least one fleet driver of the at least one transport vehicle.

15. The method of claim 14, wherein combining the vehicle safety metrics of the data sets into the plurality of combined representations comprises:

determining at least one of the combined representations to be a proportion of a number of the vehicle safety metrics determined to not conform to the respective threshold to a total number of the vehicle safety metrics determined to have sufficient data.

16. The method of claim 14, wherein the vehicle operations data is received in multiple different formats from multiple disparate data sources, wherein the processing comprises converting the vehicle operations data to a common format.

17. The method of claim 14 further comprising filtering the vehicle operations data to conform to a selected time period.

18. The method of claim 14 further comprising providing a user interface configured to receive manual input of a comment associated with the report, and including the comment and a date stamp of the comment in the report.

19. The method of claim 14 further comprising providing a user interface configured to allow selection of the reporting criterion.

20. A system for processing data related to transport vehicle fleet safety, the system comprising:

one or more servers connected to a network and configured to receive vehicle operations data from a plurality of disparate data sources that receive data from a plurality of sensor-based data capturing devices installed at a plurality of transport vehicles;

the one or more servers further configured to convert the vehicle operations data from multiple different formats used by the data sources to a common format;

the one or more servers further configured to provide a user interface configured to allow selection of data sets from the converted vehicle operations data according to different criteria;

the one or more servers further configured to process the selected data sets to obtain and output for display different vehicle safety metrics defined by different sensors connected to the data capturing devices;

the one or more servers further configured to compare at least one of the vehicle safety metrics to a threshold configured for the vehicle safety metric, the threshold being calculated based on past values of a respective data set of the selected data sets on which the vehicle safety metric is based, the threshold being offset from an average value by a deviation, the average value being calculated from a first set of past values of the respective data set, the deviation being calculated from a second set of past values of the respective data set, and the second set of past values covering a longer time range than the first set of past values;

the one or more servers further configured to output an indication of non-conformance to a manager device associated with a manager of fleet drivers of the transport vehicle fleet when the compared vehicle safety metric does not conform to the threshold, the indication of non-conformance configured for safety analysis of past operation of at least one transport vehicle of the fleet for oversight by management and feedback to at least one fleet driver of the at least one transport vehicle.

21. The system of claim 20, wherein the one or more servers are further configured to combine different sets of the vehicle safety metrics to obtain different combined representations of different categorical aspects of vehicle safety.

22. The system of claim 21, wherein the one or more servers are further configured to determine at least one of the combined representations to be a proportion of a number of the vehicle safety metrics determined to not conform to the respective threshold to a total number of the vehicle safety metrics determined to have sufficient data.

23. The system of claim 22, wherein the different vehicle safety metrics selectable from the user interface comprise two or more of: short-term driving time violations, long-term driving time violations, vehicle brake adjustment status, vehicle crash conditions, vehicle computer fault codes, vehicle location, hard braking, excessive engine speed, vehicle operation time, engine idle time, vehicle lane departures, vehicle mileage, vehicle fuel economy, vehicle overspeed, vehicle rollover conditions, and vehicle tire pressure.

24. The system of claim 23, wherein the different combined representations of different categorical aspects of vehicle safety are selectable from the user interface and comprise representations indicating two or more of: management oversight of vehicle operations, vehicle maintenance, driver behaviour, vehicle fuel consumption, unsafe driving, regulatory compliance, and vehicle dispatch information.

25. The system of claim 24, wherein the one or more servers are further configured to output the different combined representations of different categorical aspects of vehicle safety for display at the user interface on the manager device connected to the one or more servers via the network.

26. The system of claim 20, wherein the one or more servers are further configured to receive vehicle violation data from one or more government data sources and to output for display representations of the vehicle violation data in association with the different vehicle safety metrics.

27. The system of claim 20, wherein the one or more servers are further configured to adjust missing or erroneous values of the vehicle operations data.

28. A system for processing data related to transport vehicle fleet safety, the system comprising:
one or more servers connected to a network and configured to receive vehicle operations data from a plurality of disparate data sources that receive data from a plurality of sensor-based data capturing devices installed at a plurality of transport vehicles;
the one or more servers further configured to adjust missing or erroneous values of the vehicle operations data;
the one or more servers further configured to provide a user interface configured to allow selection of data sets from the converted vehicle operations data according to different criteria;
the one or more servers further configured to process the selected data sets to obtain and output for display different vehicle safety metrics defined by different sensors connected to the data capturing devices;
the one or more servers further configured to compare at least one of the vehicle safety metrics to a threshold configured for the vehicle safety metric, the threshold being calculated based on past values of a respective data set of the selected data sets on which the vehicle safety metric is based, the threshold being offset from an average value by a deviation, the average value being calculated from a first set of past values of the respective data set, the deviation being calculated from a second set of past values of the respective data set, and the second set of past values covering a longer time range than the first set of past values;
the one or more servers further configured to output an indication of non-conformance to a manager device associated with a manager of fleet drivers of the transport vehicle fleet when the compared vehicle safety metric does not conform to the threshold, the indication of non-conformance configured for safety analysis of past operation of at least one transport vehicle of the fleet for oversight by management and feedback to at least one fleet driver of the at least one transport vehicle.

\* \* \* \* \*